Figure 1:
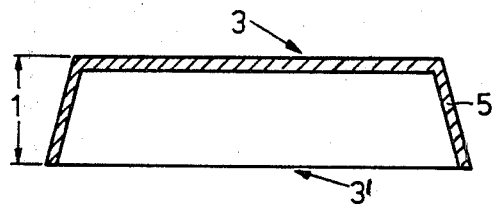

United States Patent [19]

Nielinger et al.

[11] 4,405,748

[45] Sep. 20, 1983

[54] HIGH-IMPACT POLYAMIDE MOULDING COMPOSITIONS

[75] Inventors: Werner Nielinger, Krefeld; Christian Lindner, Cologne; Ulrich Grigo, Krefeld; Rudolf Binsack, Krefeld; Friedrich Fahnler, Krefeld; Bert Brassat, Krefeld, all of Fed. Rep. of Germany

[73] Assignee: Bayer Aktiengesellschaft, Leverkusen, Fed. Rep. of Germany

[21] Appl. No.: 278,337

[22] Filed: Jun. 26, 1981

[30] Foreign Application Priority Data

Jul. 5, 1980 [DE] Fed. Rep. of Germany ....... 3025606

[51] Int. Cl.³ .................... C08L 77/00; C08K 3/40
[52] U.S. Cl. .................... 524/504; 524/494; 525/66
[58] Field of Search .................. 525/66; 524/504, 494

[56] References Cited

U.S. PATENT DOCUMENTS

| 4,173,556 | 11/1979 | Coran et al. ........................ 524/141 |
| 4,221,879 | 9/1980 | Humme et al. ..................... 525/66 |
| 4,338,406 | 7/1982 | Sanderson et al. ................. 525/66 |
| 4,338,409 | 7/1982 | Grigo et al. ........................ 525/66 |

FOREIGN PATENT DOCUMENTS

| 1121541 | 4/1982 | Canada . |
| 2454770 | 5/1976 | Fed. Rep. of Germany ........ 525/66 |
| 2703416 | 8/1978 | Fed. Rep. of Germany ...... 524/504 |
| 2906222 | 8/1980 | Fed. Rep. of Germany ........ 525/66 |

OTHER PUBLICATIONS

Derwent Abs. 52944, B/29, (7–79), EP-2761, Bayer AG.

Derwent Abs. 89403, D/49, (11–81), DE3019233, Bayer AG.

Derwent Abs. 31114, D/18, (4–81), EP-27198, Bayer AG.

*Primary Examiner*—Melvyn I. Marquis
*Assistant Examiner*—Herbert J. Lilling
*Attorney, Agent, or Firm*—Connolly and Hutz

[57] ABSTRACT

Optionally reinforced moulding compositions with high impact strength comprising polyamides and graft products of (co)polymers of butadiene and grafted units of methyl(meth)acrylate.

6 Claims, 3 Drawing Figures

HIGH-IMPACT POLYAMIDE MOULDING COMPOSITIONS

This invention relates to thermoplastic moulding compositions of polyamides and methyl-methacrylate-grafted polybutadienes having improved impact and breaking strength together with improved processibility.

In their dry state, mouldings of partially crystalline polyamides show inadequate strength for numerous applications. There are numerous ways in which their strength can be improved. In the most simple case, this is possible by storing in water. However, on account of the laboriousness of this conditioning process, which also gives products of varying properties because of its dependence upon external conditions, various proposals have been made for improving the strength of polyamides, even in their dry state, by incorporating certain modifiers. Thus, according to German Offenlegungsschrift No. 2,742,176, the impact strength and notched impact strength of polyamides can be increased by incorporating graft copolymers of, preferably (meth)acrylates on cross-linked polybutadienes. However, the improvement in strength thereby obtained is not sufficient for certain applications, particularly at low temperatures. Furthermore, by using graft copolymers containing t-butyl acrylate as the graft monomer the resulting graft product intends in danger to decompose during the incorporation into the polyamide, thereby causing faults in the products.

It has now surprisingly been found that a particularly distinct improvement of the impact strength, particularly at low temperatures, can be obtained without any of the disadvantages previously mentioned by using graft products based on cross-lined polybutadienes as graft substrate and methyl methacrylates as the graft monomer for modifying polyamides. The outstanding improvement in notched impact strength at low temperatures is all the more surprising insofar as the methyl methacrylate used as the graft monomer has the highest second order transition temperature.

Accordingly, the present invention provides thermoplastic moulding compositions comprising:

(I) from 35 to 99% by weight, preferably from 50 to 97% by weight and more preferably from 65 to 95% by weight, of a polyamide having a relative viscosity (as measured on a 1% by weight solution in m-cresol at 25° C.) of from 2.0 to 5.0 and preferably from 2.2 to 4.5; and (II) from 1 to 65% by weight, preferably from 3 to 50% by weight and, more preferably, from 5 to 35% by weight, of a graft product produced from:

(a) 70 to 95% by weight, and preferably from 75 to 90% by weight, of a cross-linked (co)polymer of butadiene and/or substituted butadiene which contains at least 95% by weight of optionally substituted butadiene units, as the graft substrate, and (b) 5 to 30% by weight, and preferably from 10 to 25% by weight, of methyl methacrylate as graft monomer, the gel content of the graft substrate amounting to $\geq 70\%$ and preferably to $\geq 80\%$ by weight, as measured in toluene, the grafting yield G amounting to $\geq 0.15$ and preferably to $\geq 0.40$ and the average particle diameter of the graft copolymer amounting to between 0.2 and 0.6$\mu$, preferably to between 0.3 and 0.5$\mu$ and, more preferably, to approximately 0.4$\mu$, the sum total of I and II and of (a) and (b), respectively, amounting always to 100% by weight.

Suitable polyamides are amorphous and partially crystalline polyamides. Thus, polyamide-6, polyamide-6,6 and copolymers of these two components may be used as partially crystalline polyamides for the moulding compositions according to this invention. It is also possible to use partially crystalline polyamides of which the acid component consists completely or in part of terephthalic acid and/or isophthalic acid and/or suberic acid and/or sebacic acid and/or azelaic acid and/or adipic acid and/or cyclohexane dicarboxylic acid, of which the diamine component consists completely or in part of m- and/or p-xylylene diamine and/or hexamethylene diamine and/or 2,2,4-trimethyl hexamethylene diamine and/or 2,4,4-trimethyl hexamethylene diamine and/or isophorone diamine and of which the composition is known from the prior art.

Furthermore, it is possible to use polyamides which consist completely or in part of lactams containing from 7 to 12 carbon atoms, optionally in conjunction with one or more of the starting components mentioned above.

Particularly preferred partially crystalline polyamides are polyamide-6 and polyamide-6,6.

Suitable amorphous polyamides are products known from the prior art. They are obtained by polycondensing diamines, such as ethylene diamine, hexamethylene diamine, decamethylene diamine, 2,2,4- and/or 2,4,4-trimethyl hexamethylene diamine, m- and/or p-xylylene diamine, bis-(4-aminocyclohexyl)-methane, bis-(4-aminocyclohexyl)-propane, 3,3'-dimethyl-4,4'-diaminodicyclohexyl methane, 3-aminomethyl-3,5,5-trimethyl cyclohexyl amine, 2,5- and/or 2,6-bis-(aminomethyl)-norbornane and/or 1,4-diaminomethyl cyclohexane, with dicarboxylic acids, such as oxalic acid, adipic acid, azelaic acid, decane dicarboxylic acid, heptadecane dicarboxylic acid, 2,2,4- and/or 2,4,4- trimethyl adipic acid, isophthalic acid or terephthalic acid. Copolymers obtained by the polycondensation of several monomers are of course also suitable, as are copolymers of the type obtained with addition of amino carboxylic acids, such as $\epsilon$-aminocaproic acid, $\omega$-amino undecanoic acid or $\omega$-amino lauric acid or their lactams.

Particularly suitable amorphous polyamides are the polyamides produced from isophthalic acid, hexamethylene diamine; or from isophthalic acid, hexamethylene diamine and other diamines, such as 4,4'-diaminodicyclohexyl methane, isophorone diamine, 2,2,4- and/or 2,4,4-trimethyl hexamethylene diamine, 2,5- and/or 2,6-bis-(aminomethyl)norbornane; or from isophthalic acid, 4,4'-diaminodicyclohexyl methane and $\epsilon$-caprolactam; or from isophthalic acid, 3,3'-dimethyl-4,4'-diaminodicyclohexyl methane and lauric lactam; or from terephthalic acid and the isomer mixture of 2,2,4- and/or 2,4,4trimethyl hexamethylene diamine.

Instead of using pure 4,4'-diaminodicyclohexyl methane, it is also possible to use mixtures of the positionally-isomeric diaminodicyclohexyl methanes which consist of from 70 to 99 mol-% of the 4,4'-diamino isomer, from 1 to 30 mol-% of the 2,4'-diamino isomer, from 0 to 2 mol-% of the 2,2'-diamino isomer and optionally correspondingly higher diamines obtained by the hydrogenation of diaminodiphenyl methane of commercial quality. Up to 30% of the isophthalic acid may be replaced by terephthalic acid.

Diene rubbers based on polybutadiene and/or polyisoprene, which may contain up to 5% by weight of styrene and/or esters of (meth)acrylic acid, such as methyl or ethyl (meth)acrylate as comonomer, may be used as the graft substrate for producing the graft products. The gel content of the polymer used as graft substrate should amount to ≧70% by weight and preferably to ≧80% by weight (as measured in toluene).

The preferred graft substrate is polybutadiene.

The graft products according to the invention may be produced by any known polymerisation processes e.g. emulsion, solution, bulk, suspension or precipitation polymerisation) and by combinations of these processes.

To produce the graft products, the monomer to be grafted on is polymerised in the presence of the preformed graft substrate. In addition to the graft polymer, free homopolymer is also formed. In the context of the invention, graft products are understood to be the sum of the graft copolymers and the free polymers. The quantity of monomer grafted on and its molecular weight may be influenced within wide limits by varying the polymerisation conditions, particularly the type of polymerisation process used, the temperature, the activator system, the molecular weight regulator, the conditions for stirring and the way in which the monomer is added. According to the invention, the grafting yield G should amount to ≧0.15 and preferably to ≧0.40. The grafting yield G represents the quantitative ratio of the methacrylate grafted on to the total amount in the graft monomer and is dimensionless.

The preferred polymerisation process for the graft polymers according to the invention is emulsion polymerisation.

To produce the graft products by emulsion polymerisation, crosslinked butadiene polymers preferably obtained by emulsion polymerisation are preferably used as the graft substrate. According to the invention, it is preferred to use graft products of the type which have an "average particle diameter" $d_{50}$ of from 0.2 to 0.6$\mu$, preferably from 0.3 to 0.5$\mu$, and more particularly of the order of 0.4$\mu$ (for determination of this value, see W. Scholtan and H. Lange, Kolloid-Z and Z. Polymere 250 (1972) 782–796 and G. Kampf, H. Schuster, Angew. Makromolekulare Chemie 14 (1970), pages 111 to 129).

To produce the moulding compositions according to the invention, it is advantageous to use the graft monomer in certain quantities. According to the invention, the graft monomer should preferably consist of 5 to 30% by weight, more preferably of 10 to 25% by weight and, most preferably, of 20% by weight of methyl methacrylate.

Instead of using only one graft substrate, it is also possible to use mixtures of different graft substrates for producing the graft products. In addition, instead of using only one graft product, it is also possible to use mixtures of several graft products according to the invention differing in their structure for blending with the polyamides.

The polyamide moulding compositions according to the invention may be produced in the usual mixing units, such as mixing rolls, kneaders, single-screw and multiple-screw extruders. Twin-screw extruders are particularly suitable.

The moulding compositions may be produced in the mixing units just mentioned by melting the two components I and II together and homogenising them or by incorporating the graft product II into a melt of the polyamide I.

The temperature prevailing during production of the moulding compositions should be below 310° C. and preferably between 260° and 300° C.

Even with a low content of graft product II, the molding compositions according to the invention are distinguished by a considerable improvement in impact stength, particularly at low temperatures.

One particular feature of the moulding compositions according to the invention is the high compatibility of the two blend components, even with relatively high contents of the graft product, and the surprisingly good processing properties which are reflected on the one hand in the easy flow of the melt and on the other hand in the excellent surface of the extruded and injection-molded articles.

Another surprising feature of the moulding compositions according to the invention is their high weld line strength. In addition, the moulding compositions according to the invention are characterised by outstanding stability to thermal-oxidative ageing and to the influence of weather conditions of the type prevailing in the weather-o-meter test.

The moulding compositions according to the invention may contain standard additives, such as lubricants and mould-release agents, nucleating agents, stabilisers, flame-proofing agents and dyes. The additives are preferably added in pure form or as concentrates during compounding.

If reinforcing materials, particularly glass fibres, are added to the moulding compositions according to the invention, unexpectedly high impact and notched impact strength is observed, particularly in the event of multiaxial impact stressing.

Accordingly, the present invention also provides moulding compositions which contain:

III: from 10 to 60% by weight, preferably from 15 to 50% by weight and, more preferably, from 20 to 40% by weight, based on the total moulding composition, of reinforcing materials, particularly fibrous materials, most preferably glass fibres.

The fibres preferably have a diameter of from 8 to 14$\mu$.

Instead of or in combination with the glass fibres, the moulding compositions according to the invention may also contain other fillers or reinforcing materials, for example glass beads, asbestos, talcum, kaolin, wollastonite, Microvit, mica or chalk.

The reinforcing materials may be introduced by the usual methods, preferably using twin-screw extruders.

As already mentioned, the reinforced polyamide moulding compositions are distinguished by an unexpectedly high improvement in all their strength properties, particularly in their resistance to multiaxial impact stressing, without any significantly adverse affect upon other mechanical properties, such as flexural strength and rigidity. Accordingly, the reinforced polyamide moulding compositions are eminently suitable for the production of mouldings which are required to withstand severe impact stressing, for example for the production of housings of drilling machines and bumpers.

EXAMPLES

Production of the graft product

A solution of 80 parts by weight of deionised water, 1.5 parts by weight of the sodium salt of disproportionated abietic acid and 0.3 part by weight of potassium peroxy disulphate is initially introduced into a pressuretight, stirrer-equipped vessel. After the air has been displaced by nitrogen and the internal temperature adjusted to 55° C. 0.35 parts by weight of dodecyl mercaptan and A parts by weight of butadiene are added and the resulting mixture is polymerised. As the reaction velocity decreases with advancing polymerisation, the temperature is slowly raised to 68° C.

On completion of polymerisation, small quantities of the unreacted butadiene are removed by thorough stirring of the latex obtained under reduced pressure.

175 Parts by weight of deionised water and 0.3 part by weight of potassium peroxy disulphate are added.

After the air has been displaced by nitrogen, followed by heating to 65° C., 2 parts by weight of emulsifier (sodium salt of disproportionated abietic acid or alkyl sulphonates), dissolved in 25 parts by weight of water, and B parts by weight of the monomers indicated in Table 1 are added.

The addition time amounts to about 4 hours. To complete the reaction, the mixture is stirred for another 2 hours at 65° C. on completion of the addition.

Following the addition of 1 part by weight of a phenolic antioxidant (2,6-di-tert.-butyl-p-cresol), the graft product latex thus obtained is coagulated with 2% MgSO$_4$/acetic acid solution (mixing ratio 1:1 part by weight), the coagulate is separated off, washed free from salts and dried in vacuo at 70° C.

The composition of the graft products is shown in Table 1.

TABLE 1

Composition of the graft products

| No. | Graft substrate A parts by weight of butadiene | Graft monomer B parts by weight of (meth)acrylic | Type | Average particle diameter/μ |
|---|---|---|---|---|
| D | 90 | 10 | MMA[1] | 0.4 |
| E | 80 | 20 | MMA[1] | 0.4 |
| F | 70 | 30 | MMA[1] | 0.4 |
| G | 80 | 20 | n-BA[2] | 0.4 |
| H | 80 | 20 | n-BMA[3] | 0.4 |
| I | 80 | 20 | n-PMA[4] | 0.4 |
| K | 80 | 20 | EMA[5] | 0.4 |

[1]methyl methacrylate
[2]n-butyl acrylate
[3]n-butyl methacrylate
[4]n-propyl methacrylate
[5]ethyl methacrylate

EXAMPLES 1 to 16

Production of unreinforced moulding compositions (Examples 1 to 16)

The graft products D to K are worked into polyamide in a standard, continuous twin-screw extruder (Werner & Pfleiderer type ZSK 32), in which the polyamide has been first melted.

The graft product is introduced into the polyamide melt, preferably under a nitrogen atmosphere, through a second feed inlet. The graft product is melted and homogeneously distributed in the polyamide. It can be advantageous to degas the melt before it is extruded through the nozzle. The barrel temperatures are adjusted in such a way as to guarantee a melt temperature of 280° to 290° C. The melt strand of the mixture of polyamide and graft product is cooled in water, granulated and dried. Standard small bars (according to DIN 53 453) are injection moulded from the granulate at 260° C. in a standard injection-moulding machine.

Notched impact strength is tested at 20° C. and also at −20° C. and −40° C. (in accordance with DIN 53 453).

The composition and properties of the moulding compositions are shown in Table 2.

TABLE 2

| Example No. | Graft product type | Graft product (% by weight) | Polyamide type | η rel[6] | % by weight | Notched impact strength (kJ/m$^2$) 20° C. | −20° C. | −40° C. |
|---|---|---|---|---|---|---|---|---|
| 1 | E | 10 | PA-6 | 3.95 | 90 | 13.2 | 6.2 | 3.5 |
| 2 | D | 20 | PA-6 | 3.95 | 80 | 36.1 | 12.4 | 8.5 |
| 3 | E | 20 | PA-6 | 3.95 | 80 | 59.5 | 28.9 | 21.7 |
| 4 | E | 30 | PA-6 | 3.95 | 70 | 60.4 | 49.3 | 32.1 |
| 5 | E | 50 | PA-6 | 2.92 | 50 | 46.1 | 44.0 | 41.5 |
| 6 | F | 20 | PA-6 | 3.95 | 80 | 35.8 | 11.0 | 6.2 |
| 7 | G | 20 | PA-6 | 3.95 | 80 | 14.1 | 7.4 | 5.4 |
| 8 | H | 20 | PA-6 | 3.95 | 80 | 10.4 | 5.2 | 3.0 |
| 9 | I | 20 | PA-6 | 3.95 | 80 | 15.7 | 8.4 | 4.1 |
| 10 | K | 20 | PA-6 | 3.95 | 80 | 14.5 | 6.8 | 3.3 |
| 11 | E | 30 | PA-66 | 2.95 | 70 | 47.5 | 19.5 | 7.4 |
| 12 | D | 25 | IH[7] | | 75 | 46.1 | | |
| 13 | D | 15 | " | | 85 | 19.2 | | |
| 14 | E | 17 | " | | 83 | 53.5 | | |
| 15 | F | 25 | " | | 75 | 46.0 | | |
| 16 | F | 15 | " | | 85 | 19.1 | | |

[6]relative viscosity as measured on a 1% solution in m-cresol at 25° C. in an Ubbelohde viscosimeter
[7]polyamide of isophthalic acid and hexamethylene diamine

EXAMPLES 17 to 19

Production of reinforced moulding compositions.

Polycaprolactam having a relative viscosity of 3.1 (as measured on a 1% by weight solution in m-cresol at 25° C.), graft product E and the usual quantities of nucleating agent and mould-release agent with the composition indicated in Table 3 were melted at 250° to 280° C. in a single-screw extruder (16 mm diameter, 1500 mm long, with shearing and mixing elements). Glass fibres in the form of chopped glass fibre strands were introduced into the melt such that the mixture extruded in strand form through a nozzle contained approximately 30% by weight of glass fibres. The strands were cooled in a water bath, granulated and dried. The granulate was injection-moulded into test specimens. The test specimens were tested dry immediately after injection.

To assess the mechanical properties, tests were conducted to determine impact strength and notched impact strength (according to DIN 53 453), the damage caused by the multiaxial impact test (according to DIN 53 443) and flexural strength (according to DIN 53 452).

Experience has shown that the impact strength of fibre-reinforced materials depends to a large extent upon the degree of orientation of the fibres. In the test specimens produced by injection moulding for the impact bending test according to DIN 53 453, most of the glass fibres are oriented in the direction of flow, i.e. parallel to the length of the test specimen. The impact is applied transversely of the direction of flow (i.e. transversely of the direction of the fibres). This is the reason why higher impact strength values are measured with increasing glass fibre content. Along the direction of flow i.e. in the direction of the fibres), however, impact strength is distinctly lower.

Figure 3:
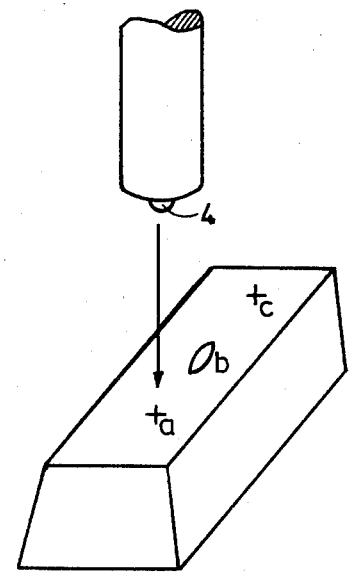

Experience has shown that a realistic picture of the strength of reinforced polyamides under impact stressing is provided by the impact or falling bolt test according to DIN 53 443, as illustrated in FIG. 3. In this Figure, the ball 4 has a radius of 25 mm, (a) represents the point of impact of the ball,
(b) represents the sprue (approximately 4 mm in diameter) in the middle of the base surface and
(c) is a test zone parallel to (a).

Figure 2:
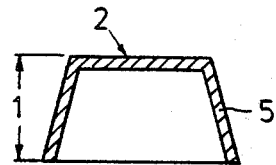

However, one important requirement is that the test specimens should have as low a degree of orientation as possible, for example like the small test box illustrated in FIGS. 1 and 2 which has a height 1 of 40 mm, a width 2 of 46.7 mm and a length 3 of 106.7 mm or 3' of 120 mm and a wall thickness 5 of 1.5 mm.

The composition and properties of the reinforced polyamide moulding compositions are shown in Table 3.

TABLE 3

| Example No. | Graft product E % by weight | Dye[8] % by weight[9] | Impact strength kJ/m$^2$ | Notched impact strength kJ/m$^2$ | Damage caused to the box N.m | Flexural strength MPa |
|---|---|---|---|---|---|---|
| 17 | 3 | 0.5 | 47.7 | 10.4 | 4.9 | 223 |
| 18 | 7 | 0.5 | 52.1 | 11.0 | 5.7 | 216 |
| 19 (Comparison Example) | 0 | 0.5 | 45.2 | 5.0 | 1.0 | 234 |

[8] ultramarine and cadmium pigments
[9] based on the moulding composition as a whole

What is claimed is:

1. A thermoplastic moulding composition comprising:
   (I) from more than 35 to less than 99% by weight of polyamide; and
   (II) from more than 1 to less than 65% by weight of a graft product produced from
      (a) 70 to 95% by weight of a cross-linked (co)-polymer of butadiene and/or substituted butadiene, which consists of at least 95% by weight of optionally substituted butadiene units, as the graft substrate and
      (b) 5 to 30% by weight of methyl methacrylate as graft monomer,
   the gel content of the graft substrate amounting to $\geq 70\%$, as measured in toluene, the grafting yield G to $\geq 0.15$ and the average particle diameter of the graft copolymer to between 0.2 and 0.6μ; optionally
   (III) from 10 to 60% by weight, based on the total moulding composition, of reinforcing materials; and optionally
   (IV) standard auxiliaries and additives,
the total sums of I to IV and of (a) and (b), respectively, amounting always to 100% by weight.

2. Moulding compositions as claimed in claim 1, comprising
   from 50 to 97% by weight of the component I and
   from 3 to 50% by weight of component II.

3. Moulding compositions as claimed in claim 1, comprising
   from 65 to 95% by weight of component I
   from 5 to 35% by weight of component II.

4. Moulding compositions as claimed in claim 1, wherein component II is produced from 75 to 90% by weight of component (a) and from 10 to 25% by weight of component (b).

5. Moulding compositions as claimed in claim 1, wherein component (a) is a polybutadiene.

6. Moulding compositions as claimed in claim 1 reinforced with glass fibres.

* * * * *